(12) United States Patent
Sugiura et al.

(10) Patent No.: US 7,955,655 B2
(45) Date of Patent: Jun. 7, 2011

(54) COATING COMPOSITIONS AND METHOD OF FORMING COATING FILM

(75) Inventors: Kazutoshi Sugiura, Yokohama (JP); Kazuhiro Masuda, Hiratsuka (JP); Hiromi Katoh, Hiratsuka (JP); Kenichi Nagai, Hiratsuka (JP); Yoshizumi Matsuno, Hadano (JP)

(73) Assignee: Kansai Paint Co., Ltd., Amagasaki-Shi (JP)

( * ) Notice: Subject to any disclaimer, the term of this patent is extended or adjusted under 35 U.S.C. 154(b) by 1095 days.

(21) Appl. No.: 10/503,127

(22) PCT Filed: Feb. 18, 2003

(86) PCT No.: PCT/JP03/01684
§ 371 (c)(1),
(2), (4) Date: Aug. 9, 2004

(87) PCT Pub. No.: WO03/068870
PCT Pub. Date: Aug. 21, 2003

(65) Prior Publication Data
US 2005/0142297 A1    Jun. 30, 2005

(30) Foreign Application Priority Data
Feb. 18, 2002    (JP) .................................. 2002-040834

(51) Int. Cl.
*C08F 2/46* (2006.01)
*B05D 1/36* (2006.01)
*C09D 167/00* (2006.01)

(52) U.S. Cl. .................. 427/384; 427/407.1; 427/402; 427/487; 524/531; 525/443

(58) Field of Classification Search ............... 427/407.1, 427/384, 402, 487; 428/480; 524/531; 525/443
See application file for complete search history.

(56) References Cited

U.S. PATENT DOCUMENTS

| | | | |
|---|---|---|---|
| 5,425,970 A | 6/1995 | Lahrmann et al. | 427/493 |
| 5,438,080 A | 8/1995 | Ohama et al. | 522/97 |
| 6,057,418 A | 5/2000 | Hartung et al. | 528/272 |
| 6,413,697 B1 * | 7/2002 | Melisaris et al. | 430/280.1 |
| 6,436,477 B2 * | 8/2002 | Laginess et al. | 427/372.2 |

FOREIGN PATENT DOCUMENTS

| | | |
|---|---|---|
| CA | 2102169 | 5/1994 |
| EP | 0596460 | 10/1997 |
| EP | 0768328 | 2/2003 |
| JP | 63-113085 | 5/1988 |
| JP | 64-11169 | 1/1989 |
| JP | 64-011169 | 1/1989 |
| JP | 01-252623 | * 10/1989 |
| JP | 1-252623 | 10/1989 |
| JP | 02-251274 | 10/1990 |
| JP | 05-263044 | 10/1993 |
| JP | 6-41496 | 2/1994 |
| JP | 08-311398 | 11/1996 |
| JP | 9-143399 | 6/1997 |
| JP | 09-143399 | * 6/1997 |
| JP | 10-324844 | 12/1998 |
| JP | 11-300272 | 11/1999 |
| JP | 2001-040247 | 2/2001 |
| JP | 2001-327911 | 11/2001 |
| WO | WO 02085999 | * 10/2002 |

OTHER PUBLICATIONS

Translation of the Kodera reference (JP 01252623) Radiation-curable resin and its coating composition (pp. 1-18).*
International Search Report dated Apr. 22, 2003.
Japanese Office Action dated Apr. 19, 2006.
German Office Action with English translation dated Mar. 16, 2006.
Japanese Office Action dated Apr. 8, 2009.

* cited by examiner

*Primary Examiner* — Nadine G Norton
*Assistant Examiner* — Mahmoud Dahimene
(74) *Attorney, Agent, or Firm* — Kratz, Quintos & Hanson, LLP

(57) ABSTRACT

The present invention provides a thermosetting and photocurable coating composition comprising: (A) at least one compound selected from the group consisting of radical-polymerizable unsaturated monomers, resins containing radical-polymerizable unsaturated groups, and resins containing radical-polymerizable unsaturated groups and thermosetting functional groups; (B) a hydroxyl-containing polyester resin produced by esterifying a polybasic acid (a) and a polyhydric alcohol (b), wherein an alicyclic polybasic acid (a1) and/or an alicyclic polyhydric alcohol (b1) are included in a ratio of 20% or more based on the total weight of polybasic acid (a) and polyhydric alcohol (b); (C) a crosslinking agent; and (D) a photopolymerization initiator; and a method of forming a coating film using the coating composition.

17 Claims, 1 Drawing Sheet

US 7,955,655 B2

COATING COMPOSITIONS AND METHOD OF FORMING COATING FILM

TECHNICAL FIELD

The present invention relates to a coating composition and a method of forming a coating film.

BACKGROUND ART

For the formation of a coating film on the bodies of vehicles such as automobiles, motorcycles, container vehicles and the like, a method is widely used which comprises applying a thermosetting coating composition that contains a resin having thermosetting functional groups, such as a hydroxyl-containing acrylic resin, and a crosslinking agent, such as a melamine resin, to the vehicle body to be coated, and thereafter curing the applied coating composition by heating. This method can form a coating film having excellent film properties in terms of adhesion, hardness, etc.

In recent years, the above-mentioned coating film formation method has been required to reduce energy consumption and increase productivity. For example, the heat-curing step on an automobile body coating line is usually conducted at about 140° C. for about 40 minutes; when the conveyor runs at a speed of 3 m/min, the step requires a space for the drying furnace line about 120 m in length. Therefore, in order to save space and energy, shortening of the heating time is demanded in the heat-curing step. Moreover, the reduction of the heating time is preferable for decreasing $CO_2$, soot, etc., which cause environmental problems.

In addition, the coating film formed on an automobile body is now increasingly required to have improved resistance to marring by car washes, scratching around keyholes, etc. in view of better appearance. It has thus become important to develop a coating composition that can form a coating film on an automobile body or the like, having excellent resistance to marring by car washes, scratching, etc.

To shorten the heating time in the formation of a coating film, Japanese Unexamined Patent Publications No. 1988-113085 and No. 1989-11169 disclose a method of coating a substrate with an ultraviolet-curable and thermosetting coating composition containing ultraviolet-curable polyfunctional (meth)acrylates, polyhydric alcohol mono(meth)acrylate polymers, and polyisocyanate compounds or melamine resins, etc., and then carrying out ultraviolet irradiation, followed by about 5 to about 30 minutes of heat-curing to form a coating film. However, although the method using this coating composition can shorten the heating time, the method cannot form a cured coating film having excellent mar resistance.

U.S. Pat. No. 5,425,970 discloses a coating film formation method that comprises forming a colored base coat on a substrate to be coated, coating the base coat with a thermosetting clear coating composition, heat-curing the resulting coating film, further coating the film with a radiation-curable clear coating composition containing radical-polymerizable binders such as (meth)acrylic-functional (meth)acrylic copolymers, epoxy resin (meth)acrylates, polyester (meth)acrylates, etc. or cationically polymerizable binders such as polyfunctional epoxy oligomers, etc. and irradiating the film to cure it. However, the method using this radiation-curable clear coating composition, although capable of reducing the total heating time, cannot form a cured coating film having excellent mar resistance.

DISCLOSURE OF THE INVENTION

An object of the present invention is to provide a coating composition that enables shortening of the heating time for forming a cured coating film, thereby contributing to saving space and energy as well as reducing $CO_2$ and other agents of environmental damage; and forming a coating film having excellent properties in mar resistance, hardness, adhesion, etc.

Another object of the invention is to provide a method of forming a coating film using the above coating composition.

Further objects and features of the invention will be apparent from the following description.

In order to achieve the above objects, the present inventors conducted extensive research. As a result, the inventors found that when a thermosetting and photocurable coating composition containing a specific radical-polymerizable compound, a specific polyester resin, a crosslinking agent and a photopolymerization initiator is used, the heating time for curing a coating film can be reduced by the addition of a photocuring step. The inventors also found that the resulting cured coating film has high elasticity as well as excellent hardness, thus providing excellent mar resistance, and that the film has other superior properties in terms of adhesion, etc. Based on these novel findings, the inventors carried out further research and accomplished the present invention.

The present invention provides a coating composition and a method of forming a coating film using the coating composition as follows.

Item 1: A thermosetting and photocurable coating composition comprising:
- (A) at least one compound selected from the group consisting of radical-polymerizable unsaturated monomers, resins containing radical-polymerizable unsaturated groups, and resins containing radical-polymerizable unsaturated groups and thermosetting functional groups;
- (B) a hydroxyl-containing polyester resin produced by esterifying a polybasic acid (a) with a polyhydric alcohol (b), wherein an alicyclic polybasic acid (a1) and/or an alicyclic polyhydric alcohol (b1) are included in a ratio of 20% or more based on the total weight of polybasic acid (a) and polyhydric alcohol (b);
- (C) a crosslinking agent; and
- (D) a photopolymerization initiator.

Item 2: A coating composition according to item 1, wherein the polybasic acid (a) includes 50% or more of alicyclic polybasic acid (a1) based on the weight of polybasic acid (a).

Item 3: A coating composition according to item 1, wherein the polyhydric alcohol (b) includes 50% or more of alicyclic polyhydric alcohol (b1) based on the weight of polyhydric alcohol (b).

Item 4: A coating composition according to item 1, wherein the polyester resin (B) has a hydroxyl value of 20 to 800 mg KOH/g.

Item 5: A coating composition according to item 1, wherein the crosslinking agent (C) is a polyisocyanate compound.

Item 6: A coating composition according to item 1, wherein the crosslinking agent (C) is a combination of a polyisocyanate compound and a melamine resin.

Item 7: A coating composition according to item 1, comprising, per 100 parts by weight of polyester resin (B), about 5 to about 200 parts by weight of compound (A), about 5 to about 200 parts by weight of crosslinking agent (C) and about 0.1 to about 20 parts by weight of photopolymerization initiator (D).

Item 8: A coating composition according to item 1, further comprising a light stabilizer (E).

Item 9: A coating composition according to item 1, further comprising an ultraviolet absorber (F).

Item 10: A coating composition according to item 1, wherein the coating composition is an organic solvent-based composition and has a solids content of about 20% to about 90% by weight.

Item 11: A method of forming a coating film comprising forming one or more colored base coats and one or more clear coats on a substrate to be coated to form a multilayer coating film, the top clear coat being formed from the coating composition according to item 1.

Item 12: A method of forming a coating film according to item 11, wherein a colored base coat and a top clear coat are formed on the substrate to form a multilayer coating film according to a two-coat system.

Item 13: A method of forming a coating film according to item 11, wherein a colored base coat, a clear coat and a top clear coat are formed on the substrate to form a multilayer coating film according to a three-coat system.

Item 14: A method of forming a coating film according to item 11, wherein a first colored base coat, a second colored base coat and a top clear coat are formed on the substrate to form a multilayer coating film according to a three-coat system.

Item 15: A method of forming a coating film according to item 11, wherein the top clear coat is cured either by irradiating with light after heating or by heating after irradiating with light.

Item 16: A method of forming a coating film according to item 15, wherein the top clear coat is heated at about 100° C. to about 180° C. for about 5 to about 30 minutes.

Item 17: A method of forming a coating film according to item 15, wherein the top clear coat is irradiated with ultraviolet light having a wavelength of about 200 to about 450 nm at an intensity of about 100 to about 5,000 mJ/cm$^2$.

Item 18: A method of forming a coating film according to item 11, wherein the substrate to be coated is a vehicle body.

Item 19: A method of forming a coating film according to item 18, wherein the substrate to be coated is an automobile body.

Item 20: A vehicle body on which a coating film is formed by the method of forming a coating film according to item 11.

Item 21: An automobile body on which a coating film is formed by the method of forming a coating film according to item 11.

The coating composition and the method of forming a coating film on a substrate according to the present invention are described below in detail.

Thermosetting and Photocurable Coating Composition

The thermosetting and photocurable coating composition of the present invention comprises the above-mentioned compound (A), hydroxyl-containing polyester resin (B), crosslinking agent (C) and photopolymerization initiator (D).

Compound (A)

The compound (A) is at least one compound selected from the group consisting of radical-polymerizable unsaturated monomers, and resins containing radical-polymerizable unsaturated groups and thermosetting functional groups.

A radical-polymerizable unsaturated monomer has one or more radical-polymerizable unsaturated groups per molecule. Such monomers are selected from the group consisting of monofunctional polymerizable monomers having one radical-polymerizable unsaturated group per molecule, bifunctional polymerizable monomers having two radical-polymerizable unsaturated groups per molecule, and polyfunctional polymerizable monomers having three or more radical-polymerizable unsaturated groups per molecule. These monomers may be used singly or in combination of two or more. Examples thereof are given below.

Examples of monofunctional polymerizable monomers include styrene, methyl (meth)acrylate, ethyl (meth)acrylate, butyl (meth)acrylate, 2-ethylhexyl (meth)acrylate, lauryl (meth)acrylate, cyclohexyl (meth)acrylate, cyclohexenyl (meth)acrylate, 2-hydroxyl (meth)acrylate, hydroxypropyl (meth)acrylate, tetrahydrofurfuryl (meth)acrylate, ε-caprolactone-modified tetrahydrofurfuryl (meth)acrylate, phenoxyethyl (meth)acrylate, phenoxy polyethylene glycol (meth)acrylate, dicyclopentenyl (meth)acrylate, dicyclopentenyloxyethyl (meth)acrylate, isobornyl (meth)acrylate, benzyl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, phthalic acid monohydroxyethyl (meth)acrylate, para-cumylphenol ethylene oxide-modified (meth)acrylate, N-methylol (meth)acrylamide, N-methylol (meth)acrylamide butyl ether, acryloyl morpholine, dimethylaminoethyl (meth)acrylate, N-vinyl-2-pyrrolidone, etc.

Examples of bifunctional polymerizable monomers include ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, neopentyl glycol di(meth)acrylate, 1,4-butanediol di(meth)acrylate, 1,6-hexanediol di(meth)acrylate, bisphenol-A ethylene oxide-modified di(meth)acrylate, bisphenol-A propylene oxide-modified di(meth)acrylate, 2-hydroxy-1-acryloxy-3-methacryloxypropane, tricyclodecane dimethanol di(meth)acrylate, di(meth)acryloyloxyethyl acid phosphate, etc. Usable bifunctional monomers include those monomers that are commercially available under the trade names of "KAYARAD HX-220," "KAYARAD HX-620," "KAYARAD R-604," "MANDA," and so on (products of Nippon Kayaku Co., Ltd.).

Examples of polyfunctional polymerizable monomers having three or more radical-polymerizable unsaturated groups per molecule include trimethylolpropane tri(meth)acrylate, trimethylolpropane ethylene oxide-modified tri(meth)acrylate, trimethylolpropane propylene oxide-modified tri(meth)acrylate, glycerin tri(meth)acrylate, glycerin ethylene oxide-modified tri(meth)acrylate, glycerin propylene oxide-modified tri(meth)acrylate, pentaerythritol tri(meth)acrylate, pentaerythritol tetra(meth)acrylate, isocyanuric acid ethylene oxide-modified triacrylate, dipentaerythritol hexa(meth)acrylate, etc.

To enhance the curability of the coating composition, mar resistance of the cured coating film, etc., preferable radical-polymerizable unsaturated monomers are those having two or more radical-polymerizable unsaturated groups per molecule.

Examples of resins containing radical-polymerizable unsaturated groups include unsaturated acrylic resins, unsaturated urethane resins, unsaturated epoxy resins, polyester (meth)acrylates, unsaturated silicone resins, etc. These resins may be used singly or in combination of two or more.

A resin containing radical-polymerizable unsaturated groups and thermosetting functional groups is a resin that has one or more radical-polymerizable unsaturated groups and one or more thermosetting functional groups per molecule. In view of better curability of the coating composition, the resin preferably contains two or more radical-polymerizable unsaturated groups and two or more thermosetting functional groups per molecule. Examples of thermosetting functional groups are hydroxyl group, acid groups, epoxy group, isocyanate group, and like functional groups. Examples of the acid groups include carboxyl group, phosphate group, etc.

Examples of resins containing radical-polymerizable unsaturated groups and thermosetting functional groups include acrylic resins containing radical-polymerizable unsaturated groups and hydroxyl groups, acrylic resins containing radical-polymerizable unsaturated groups and carboxyl groups, acrylic resins containing radical-polymerizable unsaturated groups and epoxy groups, acrylic resins containing radical-polymerizable unsaturated groups and isocyanate groups, polyester resins containing radical-polymerizable unsaturated groups and hydroxyl groups, polyester resins containing radical-polymerizable unsaturated groups and carboxyl groups, cresol novolac epoxy resins containing radical-polymerizable unsaturated groups and epoxy groups, etc. These resins may be used singly or in combination of two or more.

Hydroxyl-containing Polyester Resin (B)

The hydroxyl-containing polyester resin (B) is produced by esterifying polybasic acid(s) (a) and polyhydric alcohol(s) (b) by conventional procedures. Direct esterification methods and transesterification methods are usable for the esterification reaction.

In the preparation of polyester resin (B), the polybasic acid(s) (a) and the polyhydric alcohol(s) (b) include alicyclic polybasic acid(s) (a1) and/or alicyclic polyhydric alcohol(s) (b1) in a proportion of 20% or more, and preferably 50% to 100%, based on the total weight of polybasic acid(s) (a) and polyhydric alcohol(s) (b). This proportion allows the formation of a coating film having excellent properties in terms of mar resistance, hardness, adhesion, etc. and makes it easy to shorten the heating time for curing the coating film. When the proportion is less than 20% by weight, the resulting coating film becomes unsatisfactory in its hardness and adhesion.

The proportion of alicyclic polybasic acid (a1) in polybasic acid (a) is preferably 50% or more by weight, and more preferably 50% to 100% by weight. The proportion of alicyclic polyhydric alcohol (b1) in polyhydric alcohol (b) is preferably 50% or more by weight, and more preferably 50% to 100% by weight. When the proportions of alicyclic polybasic acid (a1) in polybasic acid (a) and alicyclic polyhydric alcohol (b1) in polyhydric alcohol (b) are each 50% or more by weight, a coating film can be formed having excellent properties in mar resistance, hardness, adhesion, etc., and the heating time for curing the coating film can be more easily shortened.

Herein, the proportions of alicyclic polybasic acid (a1) and alicyclic polyhydric alcohol (b1) are all expressed on a solids basis.

Examples of polybasic acids (a) include dibasic acids such as phthalic anhydride, isophthalic acid, terephthalic acid, cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methyl hexahydrophthalic acid, tetrahydrophthalic anhydride, hexahydrophthalic anhydride, succinic acid, fumaric acid, adipic acid, sebacic acid, maleic anhydride, etc.; lower alkyl esters of dibasic acids; tribasic or higher polybasic acids such as trimellitic anhydride, methylcyclohexene tricarboxylic acid, pyromellitic anhydride, etc.; and so on.

Of the above polybasic acids (a), alicyclic polybasic acid(s) (a1) are used in the predetermined amount. A preferable alicyclic polybasic acid (a1) is one that has one or two 4- to 6-membered rings or like alicyclic structures and two or more carboxyl groups per molecule. Examples of such preferable alicyclic polybasic acids (a1) include cyclohexane-1, 3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methyl hexahydrophthalic acid; anhydrides of these acids; etc.

One or more polybasic acids selected from the above dibasic acids and lower alkyl esters thereof are mainly used as the polybasic acid (a), with tribasic or higher polybasic acids being optionally used.

If necessary, the above polybasic acids (a) may be used in combination with monobasic acids such as benzoic acid, crotonic acid, p-t-butylbenzoic acid, etc. for molecular weight adjustment, etc. Oil fatty acids such as coconut oil fatty acid, dehydrated castor oil fatty acid, etc. may also be used.

Usable polyhydric alcohols (b) include dihydric alcohols, which have two hydroxyl groups per molecule, and polyhydric alcohols having three or more hydroxyl groups per molecule.

Examples of dihydric alcohols include glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1, 2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester, etc.; polylactone diols obtained by the addition of lactones such as ε-caprolactone or the like to these glycols; polyester diols such as bis(hydroxyethyl) terephthalate, etc.; alicyclic dihydric alcohols such as cyclohexane-1,4-dimethylol, hydrogenated bisphenol-A, spiroglycol, dihydroxymethyltricyclodecane, etc.; and so on.

Examples of polyhydric alcohols having three or more hydroxyl groups per molecule include glycerin, trimethylolpropane, trimethylolethane, diglycerin, triglycerin, 1,2,6-hexanetriol, pentaerythritol, dipentaerythritol, sorbitol, mannitol, etc.

Of the above polyhydric alcohols (b), alicyclic polyhydric alcohol(s) (b1) are used in the predetermined amount. A preferable alicyclic polyhydric alcohol (b1) is one that has one or two 4- to 6-membered rings or like alicyclic structures and two or more hydroxyl groups per molecule. Examples of such preferable alicyclic polyhydric alcohols (b1) include cyclohexane-1,4-dimethylol, hydrogenated bisphenol-A, spiroglycol, dihydroxymethyltricyclodecane, etc.

The hydroxyl-containing polyester resin (B) prepared from the above starting materials has a weight average molecular weight of usually about 500 to about 500,000, preferably about 1,000 to about 100,000, more preferably about 2,000 to 50,000; a hydroxyl value of about 20 to about 800 mg KOH/g, preferably about 80 to about 200 mg KOH/g; and an acid value of about 4 to about 200 mg KOH/g, preferably about 4 to about 100 mg KOH/g.

Crosslinking Agent (C)

The crosslinking agent (C) is a compound that undergoes a crosslinking reaction with the thermosetting functional groups of the compound (A) and the hydroxyl groups of the hydroxyl-containing polyester resin (B). Examples of such crosslinking agents (C) include polyisocyanate compounds, melamine resins, guanamine resins, urea resins, etc.

To obtain a coating film having excellent properties in mar resistance, hardness, adhesion, etc., it is preferable to use a polyisocyanate compound alone or in combination with a melamine resin. When a polyisocyanate compound and a melamine resin are used in combination, the polyisocyanate compound/melamine resin weight ratio is within the range of about 10/90 to about 90/10 on a solids basis.

The polyisocyanate is a compound having two or more free isocyanate groups per molecule. Examples thereof include organic polyisocyanates, including aliphatic diisocyanates such as hexamethylene diisocyanate, trimethyl hexamethylene diisocyanate, dimer acid diisocyanate, lysine diisocyanate, and the like; alicyclic diisocyanates such as hydrogenated xylylene diisocyanate, cyclohexylene diisocyanate, methylenebis(cyclohexyl isocyanate), isophorone diisocyanate, and the like; aromatic diisocyanates such as tolylene diisocyanate, phenylene diisocyanate, 4,4'-diphenylmethane diisocyanate, xylylene diisocyanate, tetramethylxylylene diisocyanate, naphthalene diisocyanate, and the like; trivalent or higher organic polyisocyanate compounds such as 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly referred to as triaminononane triisocyanate), and the like; etc.

Other usable polyisocyanate compounds are dimers and trimers of the above polyisocyanate compounds; prepolymers formed by the urethanation reaction of polyisocyanate compounds with polyhydric alcohols, low-molecular-weight polyester resins, water, etc. in the presence of an excess of isocyanates; and so on.

Polyisocyanate compounds may be blocked by a blocking agent. Examples of blocking agents include phenols, oximes, lactams, alcohols, mercaptanes, active methylene compounds such as diethyl malonate, etc. A blocked polyisocyanate compound is preferably used in combination with a catalyst for the dissociation of the blocking agent.

Unblocked polyisocyanate compounds and blocked polyisocyanate compounds may be used in combination.

A preferable melamine resin is, for example, obtained by etherifying part of or all of the methylol groups in a methylolated melamine with a monoalcohol having 1 to 8 carbon atoms. Preferably, the melamine resin has about 1 to about 5 triazine rings and a number average molecular weight of about 300 to about 2,000.

In the etherified melamine resin, the methylol groups in the methylolated melamine may be fully etherified, or may be partially etherified with some methylol groups or imino groups remaining. Examples of etherified melamine resins include alkyl-etherified melamine resins such as methyl-etherified melamine, ethyl-etherified melamine, butyl-etherified melamine, etc. Such etherified melamine resins may be used singly or in combination of two or more.

Photopolymerization Initiator (D)

The coating composition of the present invention contains a photopolymerization initiator (D) as an essential component. Examples of the photopolymerization initiator (D) include benzoin, benzoin methyl ether, benzoin ethyl ether, benzoin isobutyl ether, diethoxyacetophenone, 2-hydroxy-2-methyl-l-phenylpropane-1-one, benzyl dimethyl ketal, 1-hydroxycyclohexyl-phenylketone, 2-methyl-2-morpholino(4-thiomethylphenyl)propane-1-one, 2-benzyl-2-dimethylamino-1-(4-morpholinophenyl)-butanone, 2,4,6-trimethylbenzoylphenylphosphine oxide, bis(2,4,6-trimethylbenzoyl)-phenylphosphine oxide, 2,4,6-trimethylbenzoylphenylethoxyphosphine oxide, benzophenone, methyl o-benzoylbenzoate, hydroxybenzophenone, 2-isopropylthioxanthone, 2,4-dimethylthioxanthone, 2,4-diethylthioxanthone, 2,4-dichlorothioxanthone, 2,4,6-tris(trichloromethyl)-s-triazine, 2-methyl-4,6-bis(trichloro)-s-triazine, 2-(4-methoxyphenyl)-4,6-bis(trichloromethyl)-s-triazine, etc.

Such photopolymerization initiators (D) may be used singly or in combination of two or more.

The photopolymerization initiators (D) may be used in combination with photosensitizers to accelerate the photopolymerization reaction. Examples of such photosensitizers include tertiary amines such as triethylamine, triethanolamine, methyldiethanolamine, methyl 4-dimethylaminobenzoate, ethyl 4-dimethylaminobenzoate, isoamyl 4-dimethylaminobenzoate, (2-dimethylamino)ethyl benzoate, Michler's ketone, 4,4'-diethylaminobenzophenone, etc.; alkylphosphines such as triphenylphosphine, etc.; thioethers such as β-thiodiglycol, etc.; and so on.

The thermosetting and photocurable coating composition of the present invention comprises a compound (A), a hydroxyl-containing polyester resin (B), a crosslinking agent (C) and a photopolymerization initiator (D) as essential components, preferably in the following proportions.

The coating composition of the invention preferably comprises, per 100 parts by weight of polyester resin (B), about 5 to about 200 parts by weight of compound (A), about 5 to about 200 parts by weight of crosslinking agent (C) and about 0.1 to about 20 parts by weight of photopolymerization initiator (D).

When the coating composition contains compound (A), hydroxyl-containing polyester resin (B), crosslinking agent (C) and photopolymerization initiator (D) in the above specified proportion, the composition usually has satisfactory thermosetting and photocuring properties.

More preferably, the coating composition of the invention comprises per 100 parts by weight of polyester resin (B), about 5 to about 100 parts by weight of compound (A), about 5 to about 100 parts by weight of crosslinking agent (C) and about 0.1 to about 10 parts by weight of photopolymerization initiator (D).

Light Stabilizer (E)

The coating composition of the present invention may optionally contain a light stabilizer to enhance the weatherability of the coating film. The light stabilizer is used as a radical chain inhibitor to capture the active radical species generated in the course of deterioration of a coating film. Examples of such light stabilizers include hindered amine light stabilizers. The light stabilizer can optionally be used in combination with an ultraviolet absorbers (F), which is described later.

Light stabilizers having excellent light stabilization properties are, for example, hindered piperidines. Examples of hindered piperidines are monomeric hindered piperidines such as bis(1,2,2,6,6-pentamethyl-4-piperidyl) sebacate, bis (2,2,6,6-tetramethyl-4-piperidinyl) sebacate, bis(N-methyl-2,2,6,6-tetramethyl-4-piperidinyl) sebacate, 4-benzoyloxy-2,2',6,6'-tetramethylpiperidine, bis(1,2,2,6,6-pentamethyl-4-piperidyl){[3,5-bis(1,1-dimethylethyl)-4-hydroxyphenyl] methyl} butylmalonate, etc.; oligomeric hindered piperidines such as poly{[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)iminol]}, etc.; and polyester hindered piperidines such as polyesters of 4-hydroxy-2,2,6,6-tetramethyl-l-piperidineethanol and succinic acid, etc. Light stabilizers are not limited to these hindered piperidines.

When used in the thermosetting and photocurable coating composition of the invention, the light stabilizer (E) is usually used in a ratio of about 0.1% to about 10% by weight relative to the solids content of the coating composition.

Ultraviolet Absorber (F)

The coating composition of the present invention may optionally comprise an ultraviolet absorber to increase the weatherability of a coating film. The ultraviolet absorber absorbs incident light and converts light energy into a harmless form like heat energy to inhibit the start of deterioration of the coating film. The ultraviolet absorber can be used in combination with the above light stabilizer (E).

Known ultraviolet absorbers can be used, including benzotriazole absorbers, triazine absorbers, salicylic acid derivative absorbers, benzophenone absorbers, etc.

Examples of benzotriazole absorbers include 2-(2'-hydroxy-5'-methylphenyl) benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-4'-octoxyphenyl)benzotriazole, 2-{2'-hydroxy-3'-(3",4",5",6"-tetrahydrophthalimidemethyl)-5'-methylphenyl}benzotriazole, etc.

Examples of triazine absorbers include 2,4-bis(2,4-dimethylphenyl)-6-(2-hydroxy-4-isooctyloxyphenyl)-1, 3,5-triazine, 2-[4((2-hydroxy-3-dodecyloxypropyl)-oxy)-2-hydroxyphenyl]-4, 6-bis(2,4-dimethylphenyl)-1,3,5-triazine, 2-[4-((2-hydroxy-3-tridecyloxypropyl)-oxy)-2-hydroxyphenyl]-4, 6-bis(2,4-dimethylphenyl)-1,3,5-triazine2-(2,4-dihydroxyphenyl)-4, 6-bis(2,4-dimethylphenyl)-1,3,5-triazine, etc.

Examples of salicylic acid derivative absorbers include phenyl salicylate, p-octylphenylsalicylate, 4-tert-butylphenylsalicylate, etc.

Examples of benzophenone absorbers include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, 2,2'-dihydroxy-4(3-methacryloxy-2-hydroxypropoxy)benzophenone, etc.

When used in the thermosetting and photocurable coating composition of the invention, the ultraviolet absorber (F) is usually incorporated in a proportion of about 0.1% to about 10% by weight relative to the solids content of the coating composition.

To improve workability and the finish quality of a coating film, the thermosetting and photocurable coating composition of the invention is preferably in the form of an organic solvent-based composition.

Examples of usable organic solvents include aromatic solvents such as toluene, xylene, etc.; ester solvents such as ethyl acetate, propyl acetate, butyl acetate, methoxybutyl acetate, amyl acetate, methyl cellosolve acetate, cellosolve acetate, diethylene glycol monomethyl ether acetate, carbitol acetate, etc.; ether solvents such as dioxane, ethylene glycol diethyl ether, ethylene glycol dibutyl ether, etc.; ketone solvents such as acetone, methyl ethyl ketone, methyl isobutyl ketone, etc.; and so on. These organic solvents may be used singly or in combination of two or more.

To improve the finish quality of a coating film, the organic solvent is used in the coating composition of the invention preferably in such an amount that the coating composition has a solids content of about 20% to about 90% by weight, and more preferably about 30% to about 70% by weight.

The coating composition of the invention may be a clear coating composition or may be a colored coating composition containing a coloring pigment and/or an effect pigment, etc. The coating composition may optionally contain other pigments such as extender pigments.

Examples of coloring pigments include inorganic pigments such as titanium dioxide, iron oxides, etc.; organic pigments such as phthalocyanine blue, quinacridone red, perylene red, phthalocyanine green, etc.; and so on. Examples of effect pigments include aluminum flakes, mica flakes, etc. Examples of extender pigments include barium sulfate, calcium carbonate, talc, clay, etc.

If necessary, known additives such as surface modifiers, anti-sagging agents, anti-settling agents, plasticizers, etc. may be added to the coating composition of the invention.

Method of Forming a Coating Film

The coating composition of the present invention can be suitably used in various methods of forming a coating film on a substrate, as described hereinafter.

Substrate to be Coated

Although the substrate to be coated in the method of the present invention is not limited, the bodies of vehicles such as automobiles, motorcycles, container vehicles and the like are preferable. Other examples of substrates to be coated are materials for vehicle body components, including metal substrates such as aluminum sheets and plates, aluminum alloy sheets and plates, steel sheets and plates such as cold-rolled steel sheets and plates, galvanized steel sheets and plates, zinc alloy-plated steel sheets and plates, stainless steel sheets and plates, tin-plated steel sheets and plates, etc.; various plastic substrates; and so on.

The metal surface of a vehicle body or metal substrate to be coated may be pretreated by phosphating, chromating, mixed oxide treatment, etc. Further, the vehicle body, metal substrate, etc. to be coated may have an undercoating film and/or an intermediate coating film, which are formed from various electrodeposition coating compositions, etc.

Methods of Coating and Curing

The coating method for the composition of the present invention is not restricted. A wet coating film can be formed by methods such as air spray coating, airless spray coating, rotary atomization coating, electrostatic coating, curtain coating, etc. In these coating methods, an electrostatic charge may be optionally applied. Of the above methods, air spray coating, electrostatic coating, etc. are preferable. The coating composition is usually applied to a film thickness of about 10 to about 70 μm (when cured).

When carrying out air spray coating, airless spray coating or rotary atomization coating, it is preferable to use an amount of organic solvent to suitably adjust the viscosity of the coating composition depending on the coating method, which is usually within the range of about 15 to about 60 seconds at 20° C. (viscometer: Ford cup No. 4).

After coating a substrate with the coating composition, the resulting wet coating film is cured by irradiating with light after heating or by heating after irradiating with light, such that the film is substantially fully cured.

Heating can be performed by known heating means. Examples thereof include drying furnaces such as hot air furnaces, electric furnaces, infrared induction heating furnaces, etc.

The heating temperature is usually in the range of about 50° C. to about 200° C., and preferably in the range of about 70° C. to about 160° C. The heating time is usually in the range of about 5 to about 30 minutes. Under such heating conditions, a coating film can be semicured by, for example, heating at about 140° C. for about 20 minutes in the heat-curing step on an automobile body coating line. When the conveyor speed is 3 m/min, the step requires a space for a drying furnace line with a length of about 60 m, which is about half the length usually required. Space and energy thus can be saved.

The irradiating light is usually ultraviolet light having a wavelength of about 200 to about 450 nm.

A light source can be suitably selected to provide wavelengths to which a selected photopolymerization initiator is highly sensitive. Examples of sources of the above-mentioned ultraviolet light include high pressure mercury lamps, ultrahigh pressure mercury lamps, xenon lamps, carbon arc lamps, metal halide lamps, sunlight, etc. The coating film is irradiated with ultraviolet light at an energy intensity of preferably about 100 to about 5,000 mJ/cm$^2$, and more preferably about 300 to about 3,000 mJ/cm$^2$. The irradiation time is usually about 3 seconds to about 3 minutes. The coating film can be substantially fully cured in this photocuring step.

Steps of Forming a Coating Film

The coating composition of the present invention can form a coating film having excellent properties in terms of mar resistance, hardness, adhesion, etc. Therefore, the coating composition of the invention is preferably used for forming the top clear coat in the process of forming a multilayer coating film on a substrate.

The coating film formation method of the present invention comprises forming one or more colored base coats and then one or more clear coats on a substrate to be coated to form a multilayer coating film, the top clear coat being formed from the coating composition of the invention.

For example, the coating film formation method of the present invention may be any of the following multilayer coating film formation methods (a) to (c), wherein the top clear coat is formed from the clear coating composition of the invention.

Method (a): A two-coat method of forming a multilayer coating film, wherein a colored base coat and a top clear coat are formed on a substrate to be coated.

Method (b): A three-coat method of forming a multilayer coating film, wherein a colored base coat, a clear coat and a top clear coat are formed in that order on a substrate to be coated.

Method (c): A three-coat method of forming a multilayer coating film, wherein a first colored base coat, a second colored base coat and a top clear coat are formed in that order on a substrate to be coated.

Moreover, the coating composition of the present invention can also be used when forming a single-layer coating film. In this case, the coating composition may be a clear coating composition or may be a colored coating composition. Method (d) is described below as a coating film formation method in addition to the above methods.

Method (d): A one-coat method of forming a coating film, wherein a substrate is coated with the coating composition of the present invention in a single layer, and the coating composition is cured.

The steps of forming a coating film in methods (a), (b), (c) and (d) are described below in detail.

In the above method (a), the coating compositions for forming the colored base coat encompass colored coating compositions and luster coating compositions.

The colored base coating composition is an organic solvent-based or aqueous coating composition containing a base resin, a crosslinking agent for the resin and a coloring pigment.

Examples of base resins include acrylic resins, vinyl resins, polyester resins, alkyd resins, urethane resins, etc., and at least one base resin is used. Crosslinkable functional groups in the resins are, for example, hydroxyl group, epoxy group, carboxyl group, alkoxysilyl groups, etc. Examples of crosslinking agents include alkyl-etherified melamine resins, urea resins, guanamine resins, polyisocyanate compounds, blocked polyisocyanate compounds, epoxy compounds, carboxyl-containing compounds, etc., and at least one crosslinking agent is used. The proportions of base resin and crosslinking agent are preferably 50% to 90% by weight of base resin and 50% to 10% by weight of crosslinking agent, based on the total amount of the two components.

To the colored base coating composition are added coloring pigments and/or effect pigments, etc., which are mentioned above as the pigments usable for the coating composition of the present invention.

In method (a), the substrate is coated with the colored base coating composition to a film thickness of about 10 to about 50 μm (when cured) by a coating method such as airless spray coating, air spray coating, rotary atomization coating, etc. In these coating methods, an electrostatic charge may be optionally applied. After coating, the base coating composition is either cured by heating at about 100° C. to about 180° C., and preferably at about 120° C. to about 160° C., for about 10 to about 40 minutes, or is not cured with the substrate being left to stand at room temperature for several minutes or being preheated at about 40° C. to about 100° C. for about 1 to about 20 minutes.

To form a top clear coat, the substrate is further coated with the clear coating composition of the present invention to a film thickness of about 10 to about 70 μm (when cured) by a coating method as mentioned above. The coated substrate is then heated and thereafter irradiated with light, or is then irradiated with light and thereafter heated. Thus a cured multilayer coating film can be formed. Preferably, heating is performed at about 100° C. to about 180° C., especially at about 120° C. to about 160° C., for about 5 to about 30 minutes to cure the coating film by crosslinking. Light irradiation is performed under the above-described conditions of wavelength, light source, irradiation intensity and irradiation time.

Hereinafter, the method of applying a clear coating composition without heat-curing the base coating composition, and curing the two coats simultaneously may be referred to as a two-coat one-bake system (2C1B). The method of heat-curing the base coating composition, then applying a clear coating composition and curing the clear coat may be referred to as a two-coat two-bake system (2C2B).

The above-described colored base coating composition for method (a) can be used as the colored base coating composition for method (b). Any coating composition for forming a clear coating film can be used as the first clear coating composition to form a clear coat. For example, a coating composition that contains little or no pigment used in the colored base coating composition can be used. The coating composition of the present invention is used as the clear coating composition for forming a top clear coat. In addition, the clear coating composition of the invention may also be used as the first clear coating composition, so that the clear coat and the top clear coat are formed from the clear coating composition of the invention.

In method (b), as in method (a), the colored base coating composition is applied and either cured by heating, or not cured with the substrate being left to stand at room temperature for several minutes or being preheated. The colored base coating film is then coated with the first clear coating composition to a film thickness of about 10 to about 50 μm (when cured) by a coating method as mentioned above. The coating composition is either cured by heating at about 100° C. to about 180° C., and preferably at about 120° C. to about 160° C., for about 10 to about 40 minutes, or is not cured with the substrate being left to stand at room temperature for several minutes or being preheated.

The substrate is then further coated with the coating composition of the present invention as a second clear coating composition to a coating film thickness of about 10 to about 50 μm (when cured) by a coating method as mentioned above. The coated substrate is then first heated and thereafter irradiated with light, or is then irradiated with light and thereafter heated. Thus a cured multilayer coating film can be formed. The conditions for heating and irradiation are the same as in method (a).

Hereinafter, the method of applying a first clear coating composition without heat-curing the base coating composition, applying a second clear coating composition without heat-curing the first clear coating composition, and then curing the three coats simultaneously may be referred to as a three-coat one-bake system (3C1B). The method of applying a first clear coating composition without heat-curing the base coating composition, curing these coats simultaneously, and then applying and curing a second clear coating composition may be referred to as a three-coat two-bake system (3C2B). Moreover, the method of heat-curing a base coating composition, applying and curing a first clear coating composition, and then applying and curing a second clear coating composition may be referred to as a three-coat three-bake system (3C3B).

The above-described colored base coating composition for method (a) can be used as the first colored base coating composition for method (c). The second colored base coating composition is applied onto the coat of the first colored base coating composition; therefore, the second colored base coating composition is usually a clear colored composition that has weak hiding power such that the color tone of the first colored coating surface is visible through the second colored base coating film.

Hence, the second colored base coating composition is preferably prepared by selecting a suitable type of pigment and adjusting the amount thereof in view of the first colored base coating composition such that the hiding power of the second colored base composition is weaker than that of the first colored base composition. The coating composition of the present invention is used as the clear coating composition for the top clear coat.

In method (c), as in method (a), the first colored base coating composition is applied and either cured by heating, or not cured with the substrate being left to stand at room temperature for several minutes or being preheated. The first colored base coating film is then coated with the second colored base coating composition to a film thickness of about 10 to about 50 μm (when cured) by a coating method as mentioned above. The coating composition is either cured by heating at about 100° C. to about 180° C., and preferably at about 120° C. to about 160° C., for about 10 to about 40 minutes, or is not cured with the substrate being left to stand at room temperature for several minutes or being preheated.

The substrate is then further coated with the coating composition of the invention as a top clear coating composition to a film thickness of about 10 to about 50 μm (when cured) by a coating method as mentioned above. The coated substrate is then heated and thereafter irradiated with light, or is then irradiated with light and thereafter heated. Thus a cured multilayer coating film can be formed. The conditions for heating and irradiation are the same as in method (a).

Hereinafter, the method of applying a second base coating composition without heat-curing the first base coating composition, applying a clear coating composition without heat-curing the second base coating composition, and then curing the three coats simultaneously may be referred to as a three-coat one-bake system (3C1B). The method of heat-curing a first base coating composition, applying a second base coating composition, applying a clear coating composition without heat-curing the second base coating composition, and then curing these coats simultaneously may be referred to as a three-coat two-bake system (3C2B). Moreover, the method of heat-curing a first base coating composition, applying and curing a second base coating composition, and then applying and curing a clear coating composition may be referred to as a three-coat three-bake system (3C3B).

In method (d), the substrate is coated with the coating composition of the present invention to a film thickness of about 10 to about 50 μm (when cured) by the same coating method as in method (a). The coated substrate is either heated and thereafter irradiated with light, or is irradiated with light and thereafter heated. Thus a cured single-layer coating film can be formed. The conditions for heating and irradiation are the same as in method (a). This method may be hereinafter referred to as a one-coat one-bake system (1C1B).

BRIEF DESCRIPTION OF THE DRAWINGS

In FIG. 1, bracketed range 1 indicates the indentation recovery.

BEST MODE FOR CARRYING OUT THE INVENTION

Figure 1:
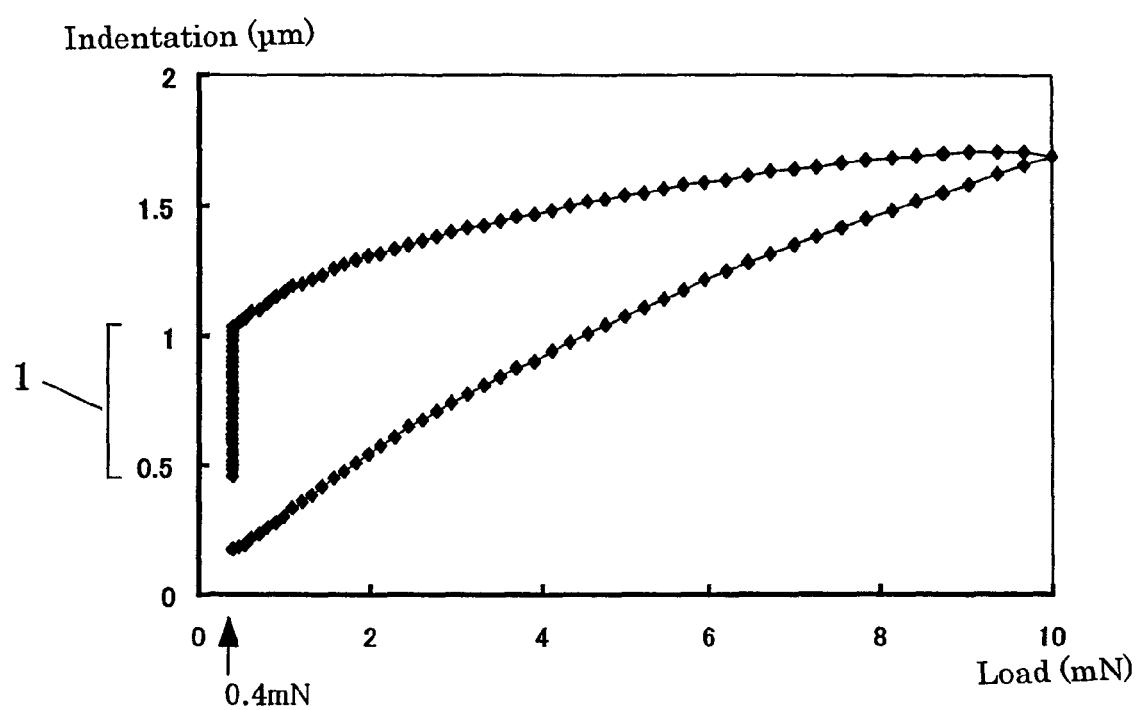
FIG. 1 is a graph showing the Vickers hardness of the coating film obtained in Example 5, measured by a micro hardness tester ("Fischerscope H-100", product of Fischer Instruments K.K.).

The present invention is described below in more detail with reference to Examples and Comparative Examples. However, the present invention is not limited by these examples. In the examples, parts and percentages are expressed on a weight basis.

Production of Compound (A)

PRODUCTION EXAMPLE 1

Production of Resin Containing Radical-polymerizable Unsaturated Groups

Eight hundred and eighty-eight parts of isophorone diisocyanate, 464 parts of 2-hydroxyethyl acrylate and 0.7 parts of hydroquinone monomethyl ether were placed into a reaction vessel equipped with a thermometer, a thermostat, a stirrer, a reflux condenser and an air blower. While blowing air into the reaction vessel, the mixture was heated to 80° C. and maintained at the same temperature for 5 hours. After confirming substantially all the 2-hydroxyethyl acrylate had reacted, an adduct of isophorone diisocyanate and 2-hydroxyethyl acrylate was obtained. Subsequently, 136 parts of pentaerythritol, 372 parts of butyl acetate and 0.2 parts of dibutyltin dilaurate were added to the adduct, and the mixture was further maintained at 80° C. After confirming substantially all the isophorone diisocyanate had reacted, the mixture was cooled, giving a solution of resin (resin No. 1) containing radical-polymerizable unsaturated groups with a resin solids content of 80%. The resin had a number average molecular weight of about 1,500 and about four radical-polymerizable unsaturated groups per molecule.

PRODUCTION EXAMPLE 2

Production of Resin Containing Radical-polymerizable Unsaturated Groups and Hydroxyl Groups Four hundred and eighty parts of butyl acetate was placed into a reaction vessel equipped with a thermometer, a thermostat, a stirrer, a reflux condenser and a dropping funnel, and was heated to 130° C. while feeding nitrogen gas into the reaction vessel. While maintaining the same temperature, a mixed solution of the following monomers and polymerization initiator was added dropwise over 3 hours via the dropping funnel.

| | |
|---|---|
| styrene | 200 parts |
| methyl methacrylate | 250 parts |
| cyclohexyl methacrylate | 200 parts |
| 2-hydroxyethyl methacrylate | 350 parts |
| 2,2'-azobis(2-methylbutyronitrile) | 50 parts |

After completion of the dropwise addition, the mixture was aged at 130° C. for 1 hour, giving a hydroxyl-containing copolymer solution with a resin solids content of 70%. The obtained resin was analyzed by gel permeation chromatography with the result that it had a number average molecular weight of about 8,000. The resin had a hydroxyl value of 138 mg KOH/g.

To this resin were added 338 parts of the adduct of isophorone diisocyanate and 2-hydroxyethyl acrylate obtained in Production Example 1, 0.4 parts of hydroquinone monomethyl ether, 145 parts of butyl acetate and 0.2 parts of dibutyltin dilaurate. While blowing air into the reaction vessel, the mixture was heated to 80° C. and maintained at the same temperature for 5 hours. After confirming substantially all the isocyanate groups had reacted, the mixture was cooled, giving a solution of resin (resin No. 2) containing radical-polymerizable unsaturated groups and hydroxyl groups with a resin solids content of 70%. The resin had a number average molecular weight of about 10,500, a radical-polymerizable unsaturated group content of 0.72 mol/kg and a hydroxyl value of 68 mg KOH/g.

Production of Hydroxyl-containing Polyester Resin (B)

PRODUCTION EXAMPLE 3

Monomer mixture 1 (Note 1) was placed into a four-necked flask equipped with a heater, a stirrer, a thermometer and a reflux condenser, and was heated to 160° C. The contents of the flask were heated from 160° C. to 230° C. over 3 hours, and maintained at 230° C. for 1 hour. The produced condensation water was distilled off using a rectification column, and 5 parts of xylene was added to the contents of the flask. Xylene and condensation water was refluxed, removing the water by a water separator.

Two hours after the addition of xylene, the measurement of acid value was started. When the acid value reached 2 mg KOH/g, the mixture was cooled to 140° C. Phthalic anhydride was then added to the mixture, which was maintained at 140° C. for 2 hours to perform an addition reaction. The reaction mixture was thereafter cooled to terminate the reaction. Mixed solvent A (Note 2) was further added, giving polyester resin No. 1 with a solids content of 70%. Polyester resin No. 1 had a weight average molecular weight of 28,000 and a hydroxyl value of 157 mg KOH/g.

(Note 1) Monomer mixture 1: a mixture of 1,4-cyclohexanedimethanol (74 parts), trimethylolpropane (65 parts), 1,4-cyclohexanecarboxylic acid (66 parts), adipic acid (74 parts) and dibutyltin dilaurate (0.5 parts)

(Note 2) Mixed solvent A: a mixture of xylene/"Swasol 1000"(product of Cosmo Oil Co., Ltd., high-boiling petroleum solvent) =50/50 (weight ratio)

PRODUCTION EXAMPLES 4 AND 5

Except that the monomer components shown in Table 1 were used, the procedure of Production Example 3 was repeated to obtain polyester resin No. 2 and polyester resin No. 3, each with a solids content of 70%. Polyester resin No. 2 had a weight average molecular weight of 32,000 and a hydroxyl value of 150 mg KOH/g. Polyester resin No. 3 had a weight average molecular weight of 30,000 and a hydroxyl value of 172 mg KOH/g.

Table 1 shows the monomer components of polyester resin No. 1 to No. 3, and the proportion of alicyclic polybasic acid and/or alicyclic polyhydric alcohol to the monomers in total.

TABLE 1

| | Polyester resin No. | | |
|---|---|---|---|
| | 1 | 2 | 3 |
| 1,4-cyclohexanedimethanol | 74 | 74 | |
| Trimethylolpropane | 65 | 65 | 65 |
| Neopentyl glycol | | | 53 |
| 1,4-cyclohexanedicarboxylic acid | 66 | 153 | |
| Phthalic anhydride | | | 56 |
| Adipic acid | 74 | | 74 |
| Dibutyltin dilaurate | 0.5 | 0.5 | 0.5 |
| Proportion of alicyclic polybasic acid and alicyclic polyhydric alcohol to the monomers in total (%) | 50.2 | 77.7 | 0 |
| Proportion of alicyclic polyhydric alcohol to polyhydric alcohol (%) | 53.2 | 53.2 | 0 |
| Proportion of alicyclic polybasic acid to polybasic acid (%) | 47.1 | 100 | 0 |

Production of Hydroxyl-containing Acrylic Resin

PRODUCTION EXAMPLE 6

Four hundred and eighty parts of butyl acetate was placed into a reaction vessel equipped with a thermometer, a thermostat, a stirrer, a reflux condenser and a dropping funnel, and was heated to 130° C. while feeding nitrogen gas into the reaction vessel. While 10 maintaining the same temperature, a mixed solution of the following monomers and polymerization initiator was added dropwise over 3 hours via the dropping funnel.

| | |
|---|---|
| styrene | 200 parts |
| methyl methacrylate | 290 parts |
| cyclohexyl methacrylate | 250 parts |
| 2-hydroxyethyl methacrylate | 260 parts |
| 2,2'-azobis(2-methylbutyronitrile) | 50 parts |

After completion of the dropwise addition, the mixture was aged at 130° C. for 1 hour, giving a solution of hydroxyl-containing acrylic resin with a resin solids content of 70%. The obtained resin was analyzed by gel permeation chromatography with the result that it had a number average molecular weight of about 8,000. The resin had a hydroxyl value of 107 mg KOH/g.

Production of Coating Composition

EXAMPLE 1

Thirty-five parts of resin No. 1 obtained in Production Example 1, 100 parts of polyester resin No. 1 obtained in Production Example 3, and 28 parts of "Sumidur N-3300" (Note 3) were mixed with stirring. After 3 parts of "IRGACURE 184"(Note 6) was added and dissolved in the mixture, 1 part of "TINUVIN 400"(Note 8) and 1 part of "SANOL LS-292"(Note 9) were further added and dissolved in the mixture. The resulting mixture was diluted with xylene to adjust its viscosity to 25 seconds at 20° C. (viscometer: Ford cup No. 4), giving clear coating composition No. 1 of the present invention with a solids content of 50%.

EXAMPLES 2 TO 4 AND COMPARATIVE EXAMPLES 1 TO 4

Except that the components shown in Table 2 were used, the procedure of Example 1 was repeated to obtain clear coating compositions No. 2 to No. 4 of the present invention in Examples 2 to 4, and comparative clear coating compositions No. 5 to No. 8 in Comparative Examples 1 to 4.

Table 2 shows the proportions of the components of coating compositions No. 1 to No. 8 on a solids basis and the solids content of the compositions.

TABLE 2

| Coating composition | No. 1 | No. 2 | No. 3 | No. 4 | No. 5 | No. 6 | No. 7 | No. 8 |
|---|---|---|---|---|---|---|---|---|
| Resin No. 1 in Production Ex. 1 | 35 | | | 35 | 35 | | | |
| Resin No. 2 in Production Ex. 2 | | 35 | | | | | | |
| Pentaerythritol tetraacrylate | | | | | | 35 | | |
| Dipentaerythritol hexaacrylate | | | 32 | | | | | 100 |
| Polyester resin No. 1 | 100 | 100 | | 100 | | | | |
| Polyester resin No. 2 | | | 100 | | | | | |
| Polyester resin No. 3 | | | | | 100 | | | |
| Acrylic resin in Production Ex. 6 | | | | | | | 100 | 100 |
| Sumidur N-3300 (Note 3) | 28 | 28 | 30 | 20 | 28 | 36 | | |
| Cymel 325 (Note 4) | | | | 8 | | | | |
| Cymel 235 (Note 5) | | | | | | | 36 | |
| IRGACURE 184 (Note 6) | 3 | 3 | 2 | 2 | 3 | 2.5 | | 3 |
| IRGACURE 819 (Note 7) | | | 0.5 | 0.5 | | | 0.5 | |
| TINUVIN 400 (Note 8) | 1 | 1 | 1.5 | 0.7 | 1 | 1 | 1.3 | 1 |
| SANOL LS-292 (Note 9) | 1 | 1 | 1.5 | 1.5 | 1 | 1.5 | 1.3 | 1 |
| solids content (%) | 50 | 45 | 52 | 51 | 52 | 52 | 50 | 85 |

In Table 2, (Note 3) to (Note 9) indicate the following:
(Note 3) Sumidar N-3300: trade name, product of Sumika Bayer Urethane Co. Ltd., isocyanurate-modified hexamethylene diisocyanate, solids: 100%
(Note 4) Cymel 325: trade name, product of Mitsui Cytec Ltd., methylated/imino melamine resin
(Note 5) Cymel 235: trade name, product of Mitsui Cytec Ltd., methylated/butylated melamine resin
(Note 6) IRGACURE 184: trade name, product of Ciba Specialty Chemicals K. K., photopolymerization initiator
(Note 7) IRGACURE 819: trade name, product of Ciba Specialty Chemicals K. K., photopolymerization initiator
(Note 8) TINUVIN 400: trade name, Ciba Speciality Chemicals K. K., triazine ultraviolet absorber
(Note 9) SANOL LS-292: trade name, Sankyo Co., Ltd., light stabilizer, bis(1,2,2,6,6-pentamethyl-4-piperidyl) sebacate

PRODUCTION EXAMPLE 7

Production of Test Sheet

A zinc phosphate-treated galvanized steel sheet (length: 25 cm, width: 25 cm, thickness: 0.8 mm) was coated with a cationic electrodeposition coating composition (trade name: "Elecron GT-10LF", product of Kansai Paint Co., Ltd.) by electrodeposition to a film thickness of about 20 µm (when cured). The coated sheet was heated at 170° C. for 20 minutes to cure the coating film. The sheet was further coated with a coating composition for an automobile intermediate coat (trade name: "Amilac TP-65-2", product of Kansai Paint Co., Ltd.) by air spraying to a film thickness of about 35 µm (when cured). The coated sheet was heated at 140° C. for 30 minutes to cure the coating film, thus giving a test sheet.

Coating Film Formation Method

EXAMPLE 5

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 µm (when cured) and was dried at 80° C. for 10 minutes to vaporize the water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 µm (when cured). The coated sheet was heated at 140° C. for 30 minutes to simultaneously cure the base coating film and the clear coating film.

The cured clear coating film was coated with coating composition No. 1 obtained in Example 1 by air spraying to a film thickness of about 40 µm (when cured). The resulting coating film was dried at 90° C. for 3 minutes in a preheating step to evaporate the solvent. Subsequently, using a 120 W/cm metal halide lamp as a light source, the coating film was irradiated for photocuring with ultraviolet light (wavelength: about 365 nm) for about 10 seconds at an intensity of 1,000 mJ/cm$^2$, and thereafter heated at 140° C. for 5 minutes to cure the coating film.

Thus a multilayer coating film was formed by the three-coat two-bake system.

EXAMPLE 6

In a similar manner as in Example 5 except that the coating film after photocuring was heated at 140° C. for 30 minutes, a multilayer coating film was formed by the three-coat two-bake system.

EXAMPLE 7

In a similar manner as in Example 5 except that coating composition No. 2 obtained in Example 2 was used in place of coating composition No. 1, a multilayer coating film was formed by the three-coat two-bake system.

EXAMPLE 8

In a similar manner as in Example 5 except that coating composition No. 3 obtained in Example 3 was used in place of coating composition No. 1, a multilayer coating film was formed by the three-coat two-bake system.

EXAMPLE 9

In a similar manner as in Example 5 except that coating composition No. 4 obtained in Example 4 was used in place of coating composition No. 1, and that the coating film after photocuring was heated at 140° C. for 10 minutes, a multilayer coating film was formed by the three-coat two-bake system.

EXAMPLE 10

In a similar manner as in Example 6 except that coating composition No. 4 obtained in Example 4 was used in place of coating composition No. 1, a multilayer coating film was formed by the three-coat two-bake system.

EXAMPLE 11

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to vaporize the water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 μm (when cured). The uncured clear coating film was coated with coating composition No. 1 obtained in Example 1 by air spraying to a film thickness of about 40 μm (when cured). The resulting coating film was heated at 140° C. for 30 minutes. Subsequently, using a 120 W/cm metal halide lamp as a light source, the coating film was irradiated for photocuring with ultraviolet light (wavelength: about 365 nm) for about 10 seconds at an intensity of 1,000 mJ/cm$^2$ to simultaneously cure the three-layer coating film.

Thus a multilayer coating film was formed by the three-coat one-bake system.

EXAMPLE 12

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to vaporize the water in the coating film.

The uncured coating surface was coated with coating composition No. 1 obtained in Example 1 by air spraying to a film thickness of about 40 μm (when cured). The resulting coating film was dried at 90° C. for 3 minutes in a preheating step to evaporate the solvent. Subsequently, using a 120 W/cm metal halide lamp as a light source, the coating film was irradiated for photocuring with ultraviolet light (wavelength: about 365 nm) for about 10 seconds at an intensity of 1,000 mJ/cm$^2$, and thereafter heated at 140° C. for 30 minutes to simultaneously cure the two-layer coating film.

Thus a multilayer coating film was formed by the two-coat one-bake system.

Table 3 shows the top clear coating compositions, coating film formation steps and film-curing conditions used in Examples 5 to 12.

TABLE 3

|  |  | Example | | | | | | | |
| --- | --- | --- | --- | --- | --- | --- | --- | --- | --- |
|  |  | 5 | 6 | 7 | 8 | 9 | 10 | 11 | 12 |
| Coating composition | | No. 1 | No. 1 | No. 2 | No. 3 | No. 4 | No. 4 | No. 1 | No. 1 |
| Coating film formation step | | 3C2B | 3C2B | 3C2B | 3C2B | 3C2B | 3C2B | 3C1B | 2C1B |
| Irradiation | Intensity(mJ/cm$^2$) | 1,000 | 1,000 | 1,000 | 1,000 | 1,000 | 1,000 |  | 1,000 |
|  | Time(sec) | 10 | 10 | 10 | 10 | 10 | 10 |  | 10 |
| Heating | Temperature(° C.) | 140 | 140 | 140 | 140 | 140 | 140 | 140 | 140 |
|  | Time(min) | 5 | 30 | 5 | 5 | 10 | 30 | 30 | 30 |
| Irradiation | Intensity(mJ/cm$^2$) |  |  |  |  |  |  | 1,000 |  |
|  | Time(sec) |  |  |  |  |  |  | 10 |  |

COMPARATIVE EXAMPLE 5

In a similar manner as in Example 5 except that coating composition No. 5 obtained in Comparative Example 1 was used in place of coating composition No. 1, a multilayer coating film was formed by the three-coat two-bake system.

COMPARATIVE EXAMPLE 6

In a similar manner as in Example 5 except that coating composition No. 6 obtained in Comparative Example 2 was used in place of coating composition No. 1, a multilayer coating film was formed by the three-coat two-bake system.

COMPARATIVE EXAMPLE 7

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to vaporize the water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 μm (when cured). The coated sheet was heated at 140° C. for 30 minutes to simultaneously cure the base coating film and the clear coating film.

The cured clear coating film was coated with coating composition No. 7 obtained in Comparative Example 3 by air spraying to a film thickness of about 40 μm (when cured). The resulting coating film was cured only by heating at 140° C. for 5 minutes without ultraviolet irradiation. Thus a multilayer coating film was formed by the three-coat two-bake system.

COMPARATIVE EXAMPLE 8

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to vaporize the water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 μm (when cured). The coated sheet was heated at 140° C. for 30 minutes to simultaneously cure the base coating film and the clear coating film.

The cured clear coating film was coated with coating composition No. 7 obtained in Comparative Example 3 by air spraying to a film thickness of about 40 μm (when cured). The resulting coating film was cured only by heating at 140° C. for 30 minutes without ultraviolet irradiation. Thus a multilayer coating film was formed by the three-coat two-bake system.

COMPARATIVE EXAMPLE 9

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to vaporize the water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 μm (when cured). The coated sheet was heated at 140° C. for 30 minutes to simultaneously cure the base coating film and the clear coating film.

The cured clear coating film was coated with coating composition No. 8 obtained in Comparative Example 4 by air spraying to a film thickness of about 40 μm (when cured). The resulting coating film was dried at 90° C. for 3 minutes in a preheating step to evaporate the solvent. Subsequently, using a 120 W/cm metal halide lamp as a light source, the coating film was irradiated with ultraviolet light (wavelength: about 365 nm) for about 10 seconds at an intensity of 1,000 mJ/cm$^2$ to photocure the coating film. Thus a multilayer coating film was formed by the three-coat two-bake system.

COMPARATIVE EXAMPLE 10

The test sheet obtained in Production Example 7 was coated with a waterborne colored coating composition for a base coat (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to vaporize the water in the coating film.

The resulting uncured coating surface was coated with coating composition No. 5 obtained in Comparative Example 1 by air spraying to a film thickness of about 40 μm (when cured). The resulting coating film was dried at 90° C. for 3 minutes in a preheating step to evaporate the solvent. Subsequently, using a 120 W/cm metal halide lamp as a light source, the coating film was irradiated for photocuring with ultraviolet light (wavelength: about 365 nm) for about 10 seconds at an intensity of 1,000 mJ/cm$^2$, and thereafter heated at 140° C. for 30 minutes to substantially fully cure the coating film. Thus a multilayer coating film was formed by the two-coat one-bake system.

Table 4 shows the top clear coating compositions, 5 coating film formation steps and film-curing conditions used in Comparative Examples 5 to 10.

TABLE 4

| | | Comparative Example | | | | | |
|---|---|---|---|---|---|---|---|
| | | 5 | 6 | 7 | 8 | 9 | 10 |
| Coating composition | | No. 5 | No. 6 | No. 7 | No. 7 | No. 8 | No. 5 |
| Coating film formation step | | 3C2B | 3C2B | 3C2B | 3C2B | 3C2B | 2C1B |
| Irradiation | Intensity (mJ/cm$^2$) | 1,000 | 1,000 | | | 1,000 | 1,000 |
| | Time(sec) | 10 | 10 | | | 10 | 10 |
| Heating | Temperature (° C.) | 140 | 140 | 140 | 140 | | 140 |
| | Time(min) | 5 | 5 | 5 | 30 | | 30 |

The multilayer coating films obtained by the coating film formation methods of Examples 5 to 12 and Comparative Examples 5 to 10 were each tested for their film properties as follows:

Degree of curing of coating film: The coating surface was wiped for 50 reciprocatory strokes with a gauze soaked with xylene and was observed to evaluate the degree of curing of the coating film according to the following criteria:

A: No changes occur on the coating surface. The coating film is sufficiently cured.

B: The coating surface is marred. The coating film is not sufficiently cured.

C: The coating surface is dissolved by the xylene. The curing of the coating film is far from sufficient.

Mar resistance: Polishing sand (trade name: "Daruma cleanser", product of Yamasan-shouten Ltd.) mixed with an equal weight of water was placed on the coated sheet. While being pressed with the flannel-covered tester terminal of a friction tester (product of Suga Test Instruments Co., Ltd., model: FR-2S), the coated sheet was rubbed back and forth for 25 reciprocating strokes under a load of 0.5 kg. The coating surface was observed to evaluate the mar resistance of the coating film according to the following criteria:

A: No changes are observed in the gloss of the coating surface. The mar resistance of the coating film is excellent.

B: The gloss of the coating surface is impaired. The mar resistance of the coating film is poor.

C: The gloss of the coating surface is severely impaired. The mar resistance of the coating film is very poor.

Knoop hardness: After the coated sheet was left in a thermostatic room at 20° C. for 4 hours, measurement was conducted using a Tukon hardness tester (TUKON microhardness tester, product of American Chain & Cable Company).

Vickers hardness: Using a micro hardness tester (trade name: "Fischerscope H-100", product of Fischer Instruments K.K.), a load increasing from 0.4 mN to 10 mN over 50 seconds was applied to the coating film surface with a diamond pyramid indenter. In the subsequent 50 seconds, the load was decreased from 10 mN to 0.4 mN. The load was then maintained at 0.4 mN for 100 seconds to determine the indentation recovery value (μm). The larger the recovery value (μm) is, the greater elasticity the coating film has. FIG. 1 is a graph showing the Vickers hardness of the multilayer coating film obtained in Example 5. In FIG. 1, bracketed range 1 indicates the indentation recovery measured during the 100-second period.

Adhesion: After the coated sheet was immersed in warm water at 40° C. for 240 hours, the cured coating film was given crosscuts with a cutter reaching down to the substrate so as to form a grid of 100 squares (2 mm x 2 mm). Adhesive tape was applied to the surface of the grid portion and forcefully pulled upward. Peeling of the top clear coating film was inspected, counting the number of remaining crosscut squares. Adhesion was evaluated in terms of the number of remaining crosscut squares per 100 crosscut squares.

Table 5 shows the test results.

TABLE 5

|  | Example | | | | | | | | Comparative Example | | | | | |
| --- | --- | --- | --- | --- | --- | --- | --- | --- | --- | --- | --- | --- | --- | --- |
|  | 5 | 6 | 7 | 8 | 9 | 10 | 11 | 12 | 5 | 6 | 7 | 8 | 9 | 10 |
| Degree of curing of coating film | A | A | A | A | A | A | A | A | A | A | C | A | A | A |
| Mar resistance | A | A | A | A | A | A | A | A | A | A | C | B | A | A |
| Knoop hardness | 5 | 7 | 5.5 | 5.5 | 7 | 9 | 6 | 7 | 2 | 7 | 1 | 8 | 20 | 2 |
| Vickers hardness | 0.7 | 0.6 | 0.6 | 0.5 | 0.5 | 0.5 | 0.7 | 0.6 | 0.3 | 0.2 | 0.1 | 0.3 | 0 | 0.3 |
| Adhesion | 100 | 100 | 100 | 100 | 100 | 100 | 100 | 100 | 100 | 80 | 0 | 100 | 0 | 100 |

The present invention achieves the following remarkable effects.

Because of its thermosetting and photocuring properties, the coating composition of the present invention can shorten the heating time for curing a coating film, thereby reducing the time for forming a cured coating film and the size of coating facilities, etc. Thus the coating composition of the invention can contribute to saving space and energy, and can reduce $CO_2$ and other factors of environmental contamination.

The coating film obtained from the coating composition of the invention has excellent properties in terms of mar resistance, hardness, adhesion, etc. It is considered that these excellent film properties are achieved because the coating composition comprises a specific hydroxyl-containing polyester resin in combination with a specific radical-polymerizable compound, a crosslinking agent and a photopolymerization initiator; the resulting cured coating film has improved elasticity as well as sufficient hardness, thus providing excellent film properties in terms of mar resistance, etc.

In the coating film formation method according to the present invention, the coating composition of the invention is used for forming a top clear coat, so that a multilayer coating film is suitably formed on a substrate such as an automobile body by a two-coat one-bake system, two-coat two-bake system, three-coat one-bake system, three-coat two-bake system, etc. The obtained multilayer coating film has excellent properties in mar resistance, hardness, adhesion, etc. In the case of an automobile body, therefore, the present invention provides greatly improved resistance to marring by car washes, scratching around keyholes, etc.

The invention claimed is:

1. A thermosetting and photocurable coating composition for automobile bodies comprising:
   (A) at least one compound selected from the group consisting of urethane resins containing radical-polymerizable unsaturated groups, and acrylic resins containing radical-polymerizable unsaturated groups and hydroxyl groups;
   (B) a hydroxyl-containing polyester resin produced by esterifying a polybasic acid (a) with a polyhydric alcohol (b),
      wherein an alicyclic polybasic acid (a1) and an alicyclic polyhydric alcohol (b1) are included in a total ratio of 50% to 100% based on the total weight of polybasic acid (a) and polyhydric alcohol (b),
      the polyhydric alcohol (b) includes 50% or more of the alicyclic polyhydric alcohol (b1) based on the weight of the polyhydric alcohol (b)
   the alicyclic polybasic acid (a1) is at least one compound selected from the group consisting of cyclohexane-1,3-dicarboxylic acid, cyclohexane-1,4-dicarboxylic acid, hexahydrophthalic acid, hexahydrotrimellitic acid, tetrahydrophthalic acid, methyl hexahydrophthalic acid; and anhydrides of these acids; and
   the alicyclic polyhydric alcohol (b1) is at least one compound selected from the group consisting of cyclohexane-1,4-dimethylol, hydrogenated bisphenol-A, spiroglycol, and dihydroxymethyltricyclodecane;
   (C) a crosslinking agent; and
   (D) a photopolymerization initiator.

2. A coating composition according to claim 1, wherein the polybasic acid (a) includes 50% or more of alicyclic polybasic acid (a1) based on the weight of polybasic acid (a).

3. A coating composition according to claim 1, wherein the polyester resin (B) has a hydroxyl value of 20 to 800 mg KOH/g.

4. A coating composition according to claim 1, wherein the crosslinking agent (C) is a polyisocyanate compound.

5. A coating composition according to claim 1, wherein the crosslinking agent (C) is a combination of a polyisocyanate compound and a melamine resin.

6. A coating composition according to claim 1, comprising, per 100 parts by weight of polyester resin (B), about 5 to about 200 parts by weight of compound (A), about 5 to about 200 parts by weight of crosslinking agent (C) and about 0.1 to about 20 parts by weight of photopolymerization initiator (D).

7. A coating composition according to claim 1, further comprising a light stabilizer (E).

8. A coating composition according to claim 1, further comprising an ultraviolet absorber (F).

9. A coating composition according to claim 1, wherein the coating composition is an organic solvent-based composition and has a solids content of about 20% to about 90% by weight.

10. A method of forming a coating film comprising forming one or more colored base coats and one or more clear coats on a substrate to be coated to form a multilayer coating film, the top clear coat being formed from the coating composition according to claim 1, wherein the top clear coat is cured either by irradiating with light after heating or by heating after irradiating with light.

11. A method of forming a coating film according to claim 10, wherein a colored base coat and a top clear coat are formed on the substrate to form a multilayer coating film according to a two-coat system.

12. A method of forming a coating film according to claim 10, wherein a colored base coat, a clear coat and a top clear coat are formed on the substrate to form a multilayer coating film according to a three-coat system.

13. A method of forming a coating film according to claim 10, wherein a first colored base coat, a second colored base coat and a top clear coat are formed on the substrate to form a multilayer coating film according to a three-coat system.

14. A method of forming a coating film according to claim 10, wherein the top clear coat is heated at about 100° C. to about 180° C. for about 5 to about 30 minutes.

15. A method of forming a coating film according to claim 10, wherein the top clear coat is irradiated with ultraviolet light having a wavelength of about 200 to about 450 nm at an intensity of about 100 to about 5,000 mJ/cm$^2$.

16. A method of forming a coating film according to claim 10, wherein the substrate to be coated is a vehicle body.

17. A method of forming a coating film according to claim 16, wherein the substrate to be coated is an automobile body.

* * * * *